US008887211B2

(12) United States Patent
Ogaki et al.

(10) Patent No.: US 8,887,211 B2
(45) Date of Patent: Nov. 11, 2014

(54) ELECTRONIC APPARATUS, METHOD FOR CONTROLLING, AND RECORDING MEDIUM

(71) Applicant: Canon Kabushiki Kaisha, Tokyo (JP)

(72) Inventors: Koji Ogaki, Koza-gun (JP); Tatsuya Kimoto, Atsugi (JP); Isao Abe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 27 days.

(21) Appl. No.: 13/653,551

(22) Filed: Oct. 17, 2012

(65) Prior Publication Data
US 2013/0104183 A1  Apr. 25, 2013

(30) Foreign Application Priority Data

Oct. 19, 2011   (JP) ................................ 2011-230027

(51) Int. Cl.
H04N 7/18        (2006.01)
G09G 5/00        (2006.01)
H04N 7/10        (2006.01)
H04N 21/4363     (2011.01)

(52) U.S. Cl.
CPC .......... *H04N 7/102* (2013.01); *H04N 21/43635* (2013.01); *G09G 5/00* (2013.01)
USPC .............................. 725/80; 725/118; 725/127

(58) Field of Classification Search
CPC .... H04N 7/102; H04N 21/43635; G09G 5/00
USPC ........................................... 725/127, 80, 118
See application file for complete search history.

(56) References Cited

U.S. PATENT DOCUMENTS

| | | | | |
|---|---|---|---|---|
| 5,043,829 A * | 8/1991 | Hahn | ............... | 360/15 |
| 6,825,858 B2 * | 11/2004 | Sato | ............... | 715/735 |
| 7,567,592 B2 * | 7/2009 | Kobayashi | .................... | 370/538 |
| 8,248,530 B2 * | 8/2012 | Sato | ............... | 348/552 |
| 8,255,579 B2 * | 8/2012 | Kikkawa et al. | .................. | 710/8 |
| 8,544,055 B2 * | 9/2013 | Kimoto et al. | ................ | 725/150 |
| 2008/0080596 A1 * | 4/2008 | Inoue et al. | ................... | 375/211 |
| 2008/0152023 A1 * | 6/2008 | Yoshida et al. | ............... | 375/257 |
| 2009/0027405 A1 * | 1/2009 | Kaga | ............................. | 345/520 |
| 2009/0150961 A1 * | 6/2009 | Kabuto et al. | ................ | 725/118 |
| 2009/0153737 A1 * | 6/2009 | Glen | ............................. | 348/571 |

(Continued)

FOREIGN PATENT DOCUMENTS

JP   2009-60204 A   3/2009

OTHER PUBLICATIONS

High-Definition Multimedia Interface. Specification Version 1.3a. Hitachi et al. Nov. 10, 2006.*

(Continued)

*Primary Examiner* — Nasser Goodarzi
*Assistant Examiner* — Michael B Pierorazio
(74) *Attorney, Agent, or Firm* — Canon USA, Inc., IP Division

(57) ABSTRACT

An electronic apparatus includes a first communication unit that includes a first connector, a second communication unit that includes a second connector, and a control unit that controls not to set the second communication unit to one of a first mode and a second mode based on a predetermined device connected to the first connector, wherein the first mode is used for transmitting video data, and the second mode is different from the first mode.

11 Claims, 3 Drawing Sheets

(56) References Cited

U.S. PATENT DOCUMENTS

| | | | |
|---|---|---|---|
| 2009/0157885 A1* | 6/2009 | Takatsuji et al. | 709/228 |
| 2009/0190040 A1* | 7/2009 | Watanabe et al. | 348/725 |
| 2009/0193490 A1* | 7/2009 | Stone et al. | 725/151 |
| 2009/0256963 A1* | 10/2009 | Sato | 348/554 |
| 2009/0281643 A1* | 11/2009 | Higuchi et al. | 700/94 |
| 2009/0282437 A1* | 11/2009 | Malec et al. | 725/40 |
| 2009/0284536 A1* | 11/2009 | Yoshida | 345/520 |
| 2009/0316004 A1* | 12/2009 | Kitamori et al. | 348/207.1 |
| 2011/0047586 A1* | 2/2011 | Koizumi et al. | 725/118 |
| 2011/0154414 A1* | 6/2011 | Kimoto et al. | 725/78 |
| 2011/0206355 A1* | 8/2011 | Toba et al. | 386/355 |
| 2013/0086622 A1* | 4/2013 | Narushima | 725/138 |
| 2013/0159565 A1* | 6/2013 | Soyannwo et al. | 710/33 |
| 2013/0232356 A1* | 9/2013 | Sato | 713/320 |
| 2013/0283333 A1* | 10/2013 | Sato et al. | 725/127 |

OTHER PUBLICATIONS

Test Engineers Guide to HDMI 1.4. National Instruments. Mar 21, 2011. Web. Mar. 25, 2011. <http://zone.ni.com/devzone/cda/tut/p/id/12680>.*

* cited by examiner

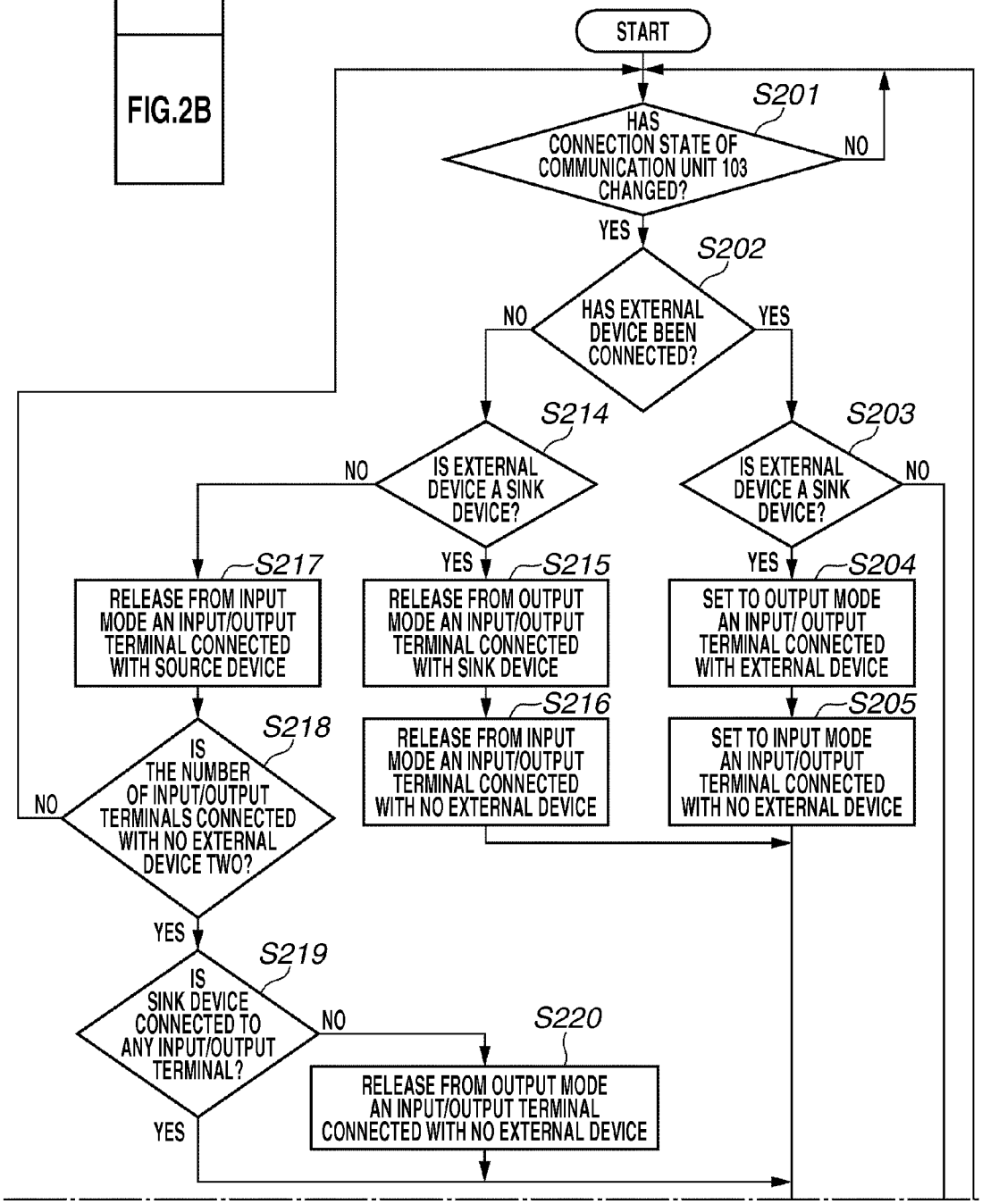

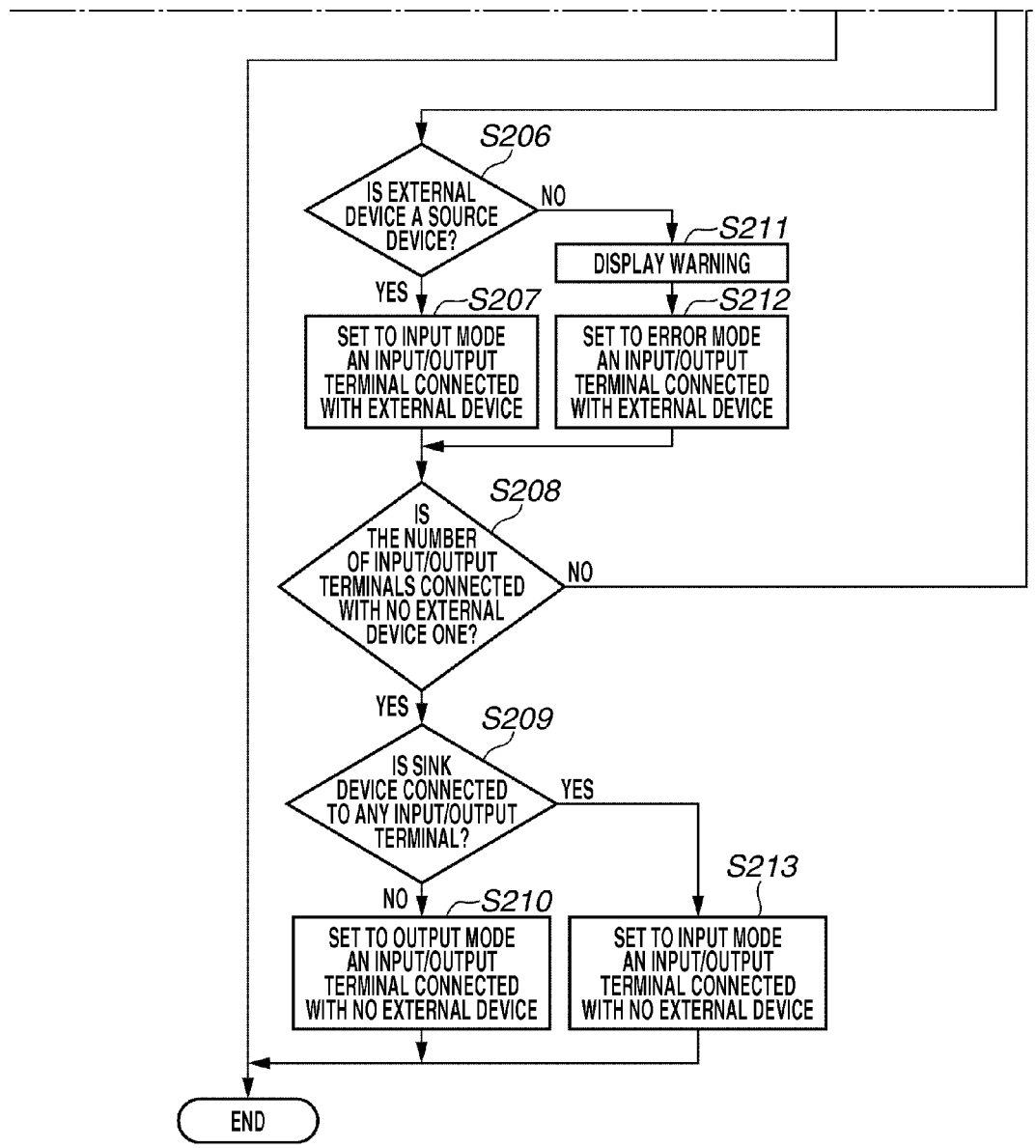

ELECTRONIC APPARATUS, METHOD FOR CONTROLLING, AND RECORDING MEDIUM

BACKGROUND OF THE INVENTION

1. Field of the Invention

The present invention relates to an electronic apparatus which performs communication with an external device, a method for controlling, and a recording medium.

2. Description of the Related Art

A communication interface called High-Definition Multimedia Interface (HDMI) (registered trademark) is currently proposed. A communication system conforming to the HDMI standard (hereinafter referred to as "HDMI system") includes a repeater having a function of a source device conforming to the HDMI standard and a sink device conforming to the HDMI standard. A source device having an output terminal for connecting an HDMI cable conforming to the HDMI standard performs process for transmitting video and audio data to a sink device via the HDMI cable. A sink device having an input terminal for connecting an HDMI cable performs process for receiving, via an HDMI cable, the video and audio data transmitted from the source device, displays the received video data, and outputs the received audio data.

In the HDMI system, the repeater can transmit a command conforming to the Consumer Electronics Control (CEC) protocol to the source and sink devices, and receive a command conforming to the CEC protocol from the source and sink devices.

Japanese Patent Application Laid-Open No. 2009-60204 discusses an electronic apparatus having an input/output terminal serving as an input terminal for connecting an HDMI cable to a sink device and as an output terminal for connecting an HDMI cable to a source device.

The electronic apparatus having the input/output terminals determines whether or not an external device connected via the HDMI cable is a sink or source device based on a voltage detected from a +5V line included in the HDMI cable and a voltage detected from a TMDS clock line included in the HDMI cable. When the external device connected to the electronic apparatus via the HDMI cable is a sink device, the electronic apparatus sets the relevant input/output terminal to the output mode, and performs transmission process for the external device. When the external device connected to the electronic apparatus via the HDMI cable is a source device, the electronic apparatus sets the relevant input/output terminal to the input mode, and performs receiving process for the external device.

When an electronic apparatus having a plurality of input/output terminals exists in the HDMI system, a plurality of sink devices may be connected to the electronic apparatus via respective input/output terminals. When a plurality of sink devices exists in the HDMI system, communication conforming to the CEC protocol (hereinafter referred to as CEC-protocol communication) cannot be normally performed in some cases.

The electronic apparatus having a plurality of input/output terminals may not determine whether or not each of external devices to be connected to the input/output terminals is a sink or source device before external devices have been connected to respective input/output terminals. Accordingly, the electronic apparatus having a plurality of input/output terminals cannot set each input/output terminal to the input or output mode before each of external devices connected to the input/output terminals is determined to be a sink or source device. In this case, a plurality of sink devices may be connected to the electronic apparatus having a plurality of input/output terminals via respective input/output terminals.

Therefore, even if the electronic apparatus can perform CEC-protocol communication with a first sink device connected to the electronic apparatus, connecting a second sink device to the electronic apparatus may disable CEC-protocol communication by the electronic apparatus.

SUMMARY OF THE INVENTION

The present invention is directed to enabling an apparatus having a plurality of input/output terminals to normally perform communication based on a command.

According to an aspect of the present invention, there is provided an electronic apparatus including a first communication unit that includes a first connector, a second communication unit that includes a second connector, and a control unit that controls not to set the second connection unit to one of a first mode and a second mode based on a predetermined device connected to the first connector, wherein the first mode is used for transmitting video data, and the second mode is different from the first mode.

According to another aspect of the present invention, there is provided a method for controlling an electronic apparatus, wherein the electronic apparatus includes a first communication unit and a second communication unit, the first communication unit includes a first connector, and the second communication unit includes a second connector, the method including: determining whether or not a predetermined device is connected to the first connector, and controlling not to set the second communication unit to one of a first mode and a second mode based on the predetermined device if the predetermined device is connected to the first connector, wherein the first mode is used for transmitting video data, and the second mode is different from the first mode.

According to yet another aspect of the present invention, there is provided a recording medium storing a program for causing a computer to execute a method for controlling an electronic apparatus, wherein the electronic apparatus includes a first connection unit and a second connection unit, the method including: determining whether or not a predetermined device is connected to the first connector, and controlling not to set the second communication unit to one of a first mode and a second mode based on the predetermined device if the predetermined device is connected to the first connector, wherein the first mode is used for transmitting video data, and the second mode is different from the first mode.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2A is a flowchart illustrating an example setting process performed by the electronic apparatus according to the first exemplary embodiment of the present invention.

FIG. 2B is a flowchart illustrating an example setting process performed by the electronic apparatus according to the first exemplary embodiment of the present invention.

FIG. 2 is a flowchart illustrating the flowcharts in FIGS. 2A and 2B.

DESCRIPTION OF THE EMBODIMENTS

Figure 1:
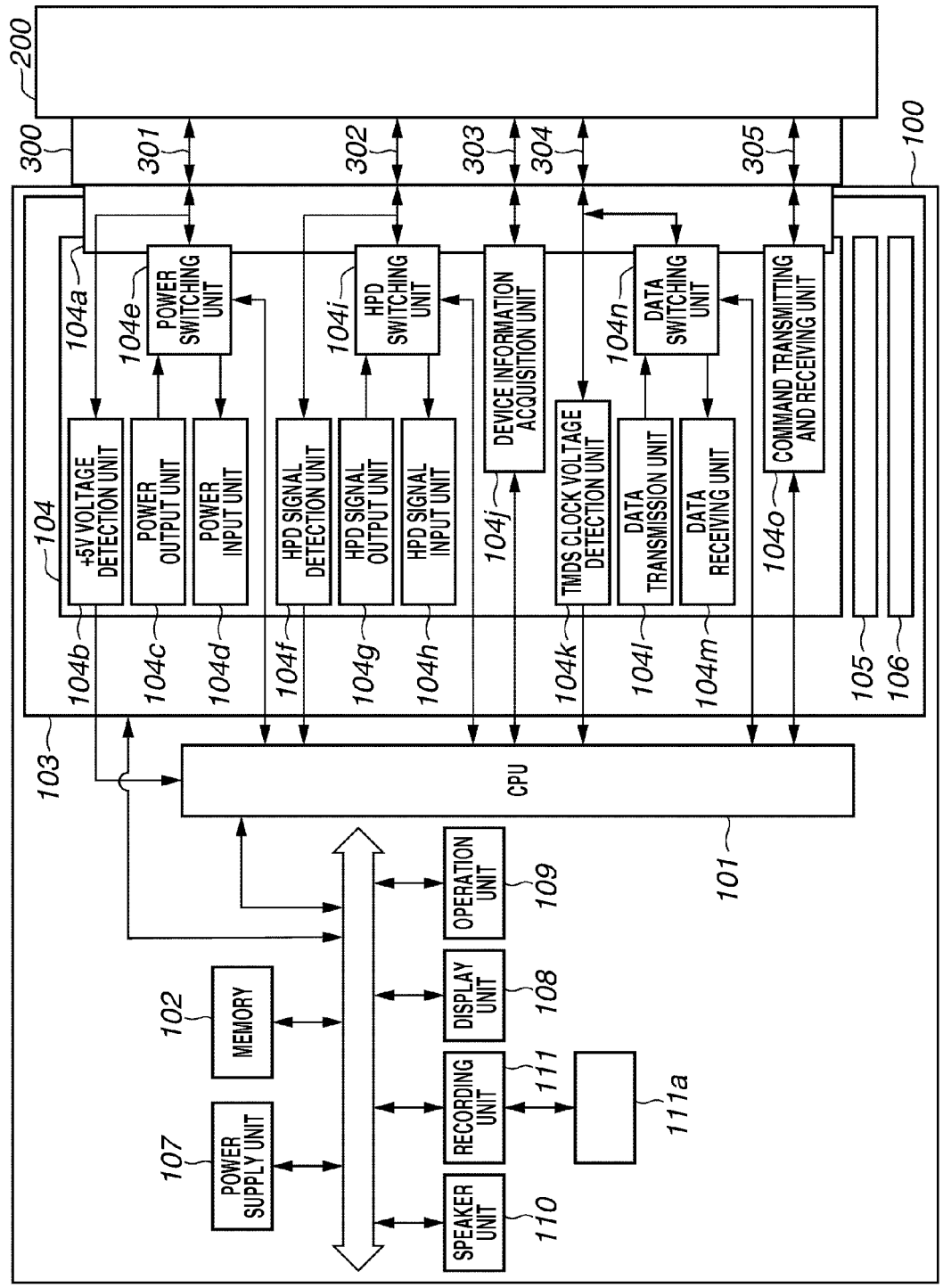
FIG. 1 is a block diagram illustrating an example configuration of an electronic apparatus according to a first exemplary embodiment of the present invention.

Various exemplary embodiments, features, and aspects of the invention will be described in detail below with reference to the drawings.

A first exemplary embodiment according to the present invention will be described below with reference to the accompanying drawings. However, the following exemplary embodiments are to be considered as illustrative and not restricted to the scope of the present invention.

FIG. 1 illustrates an example communication system conforming to the High-Definition Multimedia Interface (HDMI) according to the first exemplary embodiment of the present invention. FIG. 1 is a block diagram illustrating an example configuration of an electronic apparatus 100 and an external device 200 included in the communication system according to the first exemplary embodiment of the present invention.

As illustrated in FIG. 1, the communication system according to the first exemplary embodiment includes the electronic apparatus 100, the external device 200, and a connecting cable 300. The electronic apparatus 100 and the external device 200 are connected with each other via the connecting cable 300.

In the first exemplary embodiment, the electronic apparatus 100, the external device 200, and the connecting cable 300 conform to the HDMI standard. The electronic apparatus 100 has a function of a repeater (relaying device) prescribed in the HDMI standard. The electronic apparatus 100 can operate to achieve a function of a sink device as well as a function of a source device. The HDMI standard in the first exemplary embodiment is not limited to Version 1.3a, and may be a standard before Version1.3a and after Version 1.4. The electronic apparatus 100, the external device 200, and the connecting cable 300 according to the first exemplary embodiment may conform to a standard compatible with the HDMI standard.

Further, the electronic apparatus 100, the external device 200, and the connecting cable 300 according to the first exemplary embodiment may conform to the Digital Interactive Interface for Video & Audio (DiiVA). The electronic apparatus 100 and the external device 200 may perform wired or wireless communication with each other. The electronic apparatus 100, the external device 200, and the connecting cable 300 according to the first exemplary embodiment may conform to the Display Port (registered trademark) standard instead of the HDMI standard.

In the first exemplary embodiment, the electronic apparatus 100 and the external device 200 conform to the CEC protocol prescribed in the HDMI standard. Commands to be bidirectionally transferred between the electronic apparatus 100 and the external device 200 conform to the CEC protocol. Hereinafter, a command conforming to the CEC protocol is referred to as "CEC command."

Hereinafter, the connecting cable 300 is referred to as "HDMI cable 300."

<HDMI Cable 300>

The HDMI cable 300 will be described below with reference to FIG. 1.

The HDMI cable 300 includes a power transmission line 301, a Hot Plug Detect (HPD) line 302, and a Display Data Channel (DDC) line 303. The HDMI cable 300 further includes a Transition Minimized Differential Signaling (TMDS) line 304 and a CEC line 305.

The power transmission line 301 is a power line for unidirectionally transmitting predetermined power between the electronic apparatus 100 and the external device 200. When the external device 200 is a source device, the external device 200 supplies predetermined power to the electronic apparatus 100 via the power transmission line 301. When the external device 200 is a sink device, the electronic apparatus 100 supplies predetermined power to the external device 200 via the power transmission line 301.

The HPD line 302 is a transmission line for unidirectionally transmitting an HPD signal of the H level (high voltage level) or an HPD signal of L level (low voltage level) between the electronic apparatus 100 and the external device 200. When the external device 200 is a source device, the electronic apparatus 100 supplies the HPD signal to the external device 200 via the HPD line 302. When the external device 200 is a sink device, the external device 200 supplies the HPD signal to the electronic apparatus 100 via the HPD line 302.

The DDC line 303 is a transmission line for transmitting device information between the electronic apparatus 100 and the external device 200.

When the external device 200 is a source device, the electronic apparatus 100 supplies the device information of the electronic apparatus 100 to the external device 200 via the DDC line 303. When the external device 200 is a sink device, the external device 200 supplies the device information of the external device 200 to the electronic apparatus 100 via the DDC line 303.

The device information of the electronic apparatus 100 is extended display identification data (EDID) or enhanced EDID (E-EDID) of the electronic apparatus 100. The EDID and E-EDID of the electronic apparatus 100 are both device information of the electronic apparatus 100. Each of the EDID and E-EDID of the electronic apparatus 100 includes identification information of the electronic apparatus 100, the image display capability of the electronic apparatus 100, the audio output capability and physical address of the electronic apparatus 100. For example, the EDID and E-EDID of the electronic apparatus 100 include information about the resolution, scanning frequency, aspect ratio, and color space supported by the electronic apparatus 100. The E-EDID, an extended version of the EDID, includes more ability information than EDID does. For example, the E-EDID of the electronic apparatus 100 includes information about video and audio data formats supported by the electronic apparatus 100. Hereinafter, both the EDID and E-EDID are referred to as "EDID."

The electronic apparatus 100 can notify the external device 200 of video formats suitable for the image display capability, the audio processing capability, and the image display capability of the electronic apparatus 100, and audio formats suitable for the audio processing capability thereof by transmitting the EDID to the external device 200.

Similar to the device information of the electronic apparatus 100, device information of the external device 200 is the EDID or E-EDID of the external device 200. The EDID and E-EDID of the external device 200 include such device information as identification information of the external device 200, the image display capability of the external device 200, the audio output capability and physical address of the external device 200, and the resolution, scanning frequency, aspect ratio, and color space supported by the external device 200.

Upon reception of the EDID of the external device 200, the electronic apparatus 100 can automatically recognize the image display capability and the audio processing capability of the external device 200 by analyzing the EDID of the external device 200. Further, the electronic apparatus 100 can automatically recognize video formats applicable to the image display capability of the external device 200 and audio formats applicable to the audio processing capability thereof. By making the settings of the electronic apparatus 100 suitable for the external device 200, the electronic apparatus 100 can change video and audio data to be transmitted to the external device 200, to video and audio data suitable for the capabilities of the external device 200.

The TMDS line 304 is a transmission line for unidirectionally communicating video, audio, and auxiliary data between the electronic apparatus 100 and the external device 200. The TMDS line 304 includes a TMDS channel 0, a TMDS channel 1, a TMDS channel 2, and a TMDS clock channel.

When the external device 200 is a source device, the external device 200 supplies video, audio, and auxiliary data to the electronic apparatus 100 via the TMDS line 304. When the external device 200 is a sink device, the electronic apparatus 100 supplies video, audio, and auxiliary data to the external device 200 via the TMDS line 304.

The CEC line 305 is a transmission line for bidirectionally communicating various CEC commands between the electronic apparatus 100 and the external device 200. The electronic apparatus 100 can transmit a CEC command for controlling the external device 200 to the external device 200 via the CEC line 305. The external device 200 can transmit a CEC command for controlling the electronic apparatus 100 to the electronic apparatus 100 via the CEC line 305.

In the first exemplary embodiment, descriptions will be made with reference to an "Av amplifier" as an example electronic apparatus 100 (hereinafter the electronic apparatus 100 is referred to as "amplifier 100").

The electronic apparatus 100 may be an electronic apparatus capable of receiving video, audio, and auxiliary data via the connecting cable 300 and transmitting video, audio, and auxiliary data via the connecting cable 300 in response to the external device 200. The electronic apparatus 100 may be a repeater in the HDMI system.

In the first exemplary embodiment, the external device 200 may be a sink device such as a television, a projector, and a personal computer, or a source device such as a video camera, a digital still camera, a recorder, and a mobile phone, as long as the external device 200 conforms to the HDMI standard. Further, the external device 200 may be a repeater such as an Av amplifier.

<Amplifier 100>

An example configuration of the amplifier 100 will be described below with reference to FIG. 1.

The amplifier 100 includes a central processing unit (CPU) 101, a memory 102, a communication unit 103, a power supply unit 107, a display unit 108, an operation unit 109, a speaker unit 110, and a recording unit 111, as illustrated in FIG. 1.

The CPU 101 controls the amplifier 100 according to a computer program stored in the memory 102. The CPU 101 further generates commands conforming to the CEC standard to be transmitted to the external device 200.

The memory 102 functions as a work area for the CPU 101. The EDID of the amplifier 100, information about the amplifier 100, and a result of analysis by the CPU 101 are also stored in the memory 102. The work area for the CPU 101 is not limited to the memory 102, and may be an external storage unit such as a hard disk drive. Logical and physical addresses assigned to the amplifier 100 can also be stored in the memory 102.

A communication unit 103 includes a first communication block 104, a second communication block 105, and a third communication block 106.

The first communication block 104 includes an input/output terminal (input/output connector) 104a for connecting the HDMI cable 300, a +5V voltage detection unit 104b, a power output unit 104c, a power input unit 104d, and a power switching unit 104e. The first communication block 104 further includes an HPD signal detection unit 104f, an HPD signal output unit 104g, an HPD signal input unit 104h, and an HPD switching unit 104i. The first communication block 104 further includes a device information acquisition unit 104j, a TMDS clock voltage detection unit 104k, a data transmission unit 104l, a data receiving unit 104m, a data switching unit 104n, and a command transmitting and receiving unit 104o.

The first communication block 104 is connected with the HDMI cable 300 via the input/output terminal 104a. When the external device 200 connected via the input/output terminal 104a and the HDMI cable 300 is a source device, the amplifier 100 does not transmit video and audio data to the external device 200 via the HDMI cable 300. In this case, the amplifier 100 operates to receive video and audio data from the external device 200 via the input/output terminal 104a and the HDMI cable 300.

When the external device 200 connected via the input/output terminal 104a and the HDMI cable 300 is a sink device, the amplifier 100 does not receive video and audio data from the external device 200 via the HDMI cable 300. In this case, the amplifier 100 operates to transmit video and audio data to the external device 200 via the input/output terminal 104a and the HDMI cable 300.

The first communication block 104 is provided with three different modes: "output mode", "input mode", and "setting mode." In the "output mode", the amplifier 100 transmits video and audio data to the external device 200 via the input/output terminal 104a. In the "input mode", the amplifier 100 receives video and audio data from the external device 200 via the input/output terminal 104a. In the "setting mode", the amplifier 100 neither transmits nor receives video and audio data to/from the external device 200 via the input/output terminal 104a. The amplifier 100 stays in the setting mode before the first communication block 104 is set to either the output or input mode.

When the first communication block 104 is in the output mode, the amplifier 100 enters a state for transmitting video and audio data to the external device 200 via the input/output terminal 104a. When the first communication block 104 is in the input mode, the amplifier 100 enters a state for receiving video and audio data from the external device 200 via the input/output terminal 104a.

The +5V voltage detection unit 104b monitors a voltage supplied via the power transmission line 301. When the voltage supplied via the power transmission line 301 is higher than a predetermined voltage, the +5V voltage detection unit 104b notifies the CPU 101 of a +5V voltage signal of the H level. When the voltage supplied via the power transmission line 301 is lower than the predetermined voltage, the +5V voltage detection unit 104b notifies the CPU 101 of a +5V voltage signal of the L level. Regardless of whether or not the first communication block 104 is in the "output mode", "input mode", or "setting mode", the +5V voltage detection unit 104b can monitor the voltage supplied via the power transmission line 301.

When the first communication block 104 is in the output mode, the power output unit 104c supplies the +5V voltage to the external device 200 via the power switching unit 104e and the power transmission line 301.

When the first communication block 104 is in the input mode, the power input unit 104*d* receives the +5V voltage supplied from the external device 200 via the power switching unit 104*e* and the power transmission line 301.

When the first communication block 104 is in the output mode, the power switching unit 104*e* connects between the power output unit 104*c* and the power transmission line 301, and does not connect between the power input unit 104*d* and the power transmission line 301. When the first communication block 104 is in the input mode, the power switching unit 104*e* connects between the power input unit 104*d* and the power transmission line 301, and does not connect between the power output unit 104*c* and the power transmission line 301. The power switching unit 104*e* can also disconnect the connection between the power output unit 104*c* and the power transmission line 301. The power switching unit 104*e* can also disconnect the connection between the power input unit 104*d* and the power transmission line 301.

When connecting the power output unit 104*c* with the power transmission line 301, the power switching unit 104*e* does not connect the power input unit 104*d* with the power transmission line 301. When connecting between the power input unit 104*d* and the power transmission line 301, the power switching unit 104*e* does not connect between the power output unit 104*c* and the power transmission line 301.

The HPD signal detection unit 104*f* monitors a voltage of the HPD line 302. When the voltage of the HPD line 302 is higher than a predetermined voltage, the HPD signal detection unit 104*f* notifies the CPU 101 of the HPD signal of the H level. When the voltage of the HPD line 302 is lower than the predetermined voltage, the HPD signal detection unit 104*f* notifies the CPU 101 of the HPD signal of the L level. Regardless of whether or not the first communication block 104 is in the "output mode", "input mode", or "setting mode", the HPD signal detection unit 104*f* can monitor the voltage of the HPD line 302.

When the first communication block 104 is in the input mode, the HPD signal output unit 104*g* transmits the HPD signal of the H level or the HPD signal of the L level to the external device 200 via the HPD switching unit 104*i* and the HPD line 302.

When the first communication block 104 is in the output mode, the HPD signal input unit 104*h* receives the HPD signal of the H level or the HPD signal of the L level from the external device 200 via the HPD switching unit 104*i* and the HPD line 302.

When the first communication block 104 is in the output mode, the HPD switching unit 104*i* connects the HPD signal input unit 104*h* with the HPD line 302, and does not connect the HPD signal output unit 104*g* with the HPD line 302. When the first communication block 104 is in the input mode, the HPD switching unit 104*i* connects the HPD signal output unit 104*g* with the HPD line 302, and does not connect the HPD signal input unit 104*h* with the HPD line 302. The HPD switching unit 104*i* can also disconnect the connection between the HPD signal output unit 104*g* and the HPD line 302. The HPD switching unit 104*i* can also disconnect the connection between the HPD signal input unit 104*h* and the HPD line 302.

When connecting the HPD signal input unit 104*h* with the HPD line 302, the HPD switching unit 104*i* does not connect the HPD signal output unit 104*g* with the HPD line 302. When connecting the HPD signal output unit 104*g* with the HPD line 302, the HPD switching unit 104*i* does not connect the HPD signal input unit 104*h* with the HPD line 302.

When the first communication block 104 is in the output mode, the device information acquisition unit 104*j* requests the external device 200 for the EDID of the external device 200 via the DDC line 303, and receives the EDID of the external device 200 from the external device 200 via the DDC line 303. When the first communication block 104 is in the input mode, the device information acquisition unit 104*j* transmits the EDID of the amplifier 100 to the external device 200 upon reception of a request for the EDID of the amplifier 100 from the external device 200 via the DDC line 303.

The TMDS clock voltage detection unit 104*k* monitors the voltage supplied via the TMDS clock line included in the TMDS line 304. When the TMDS clock voltage supplied via the TMDS clock line is higher than a predetermined voltage, the TMDS clock voltage detection unit 104*k* notifies the CPU 101 of the TMDS clock voltage signal of the H level. When the TMDS clock voltage supplied via the TMDS clock line is smaller than the predetermined voltage, the TMDS clock voltage detection unit 104*k* notifies the CPU 101 of the TMDS clock voltage signal of the L level. Regardless of whether or not the first communication block 104 is in the "output mode", "input mode", or "setting mode", the TMDS clock voltage detection unit 104*k* can monitor the voltage supplied via the TMDS clock line included in the TMDS line 304.

When the first communication block 104 is in the output mode, the data transmission unit 104*l* transmits video, audio, and auxiliary data to the external device 200 via the data switching unit 104*n* and the TMDS line 304. When the first communication block 104 is in the output mode, the data transmission unit 104*l* may transmit either video or audio data to the external device 200 via the data switching unit 104*n* and the TMDS line 304.

When the first communication block 104 is in the input mode, the data receiving unit 104*m* receives via the data switching unit 104*n* and the TMDS line 304 video, audio, and auxiliary data transmitted from the external device 200.

When the first communication block 104 is in the output mode, the data switching unit 104*n* connects the data transmission unit 104*l* with the TMDS line 304, and does not connect the data receiving unit 104*m* with the TMDS line 304. When the first communication block 104 is in the input mode, the data switching unit 104*n* connects the data receiving unit 104*m* with the TMDS line 304, and does not connect the data transmission unit 104*l* with the TMDS line 304. The data switching unit 104*n* can also disconnect the connection between the data transmission unit 104*l* and the TMDS line 304. The data switching unit 104*n* can also disconnect the connection between the data receiving unit 104*m* and the TMDS line 304.

When connecting the data transmission unit 104*l* with the TMDS line 304, the data switching unit 104*n* does not connect the data receiving unit 104*m* with the TMDS line 304. When connecting the data receiving unit 104*m* with the TMDS line 304, the data switching unit 104*n* does not connect the data transmission unit 104*l* with the TMDS line 304.

The command transmitting and receiving unit 104*o* transmits to the external device 200 via the CEC line 305 a CEC command for controlling the external device 200 generated by the CPU 101. The command transmitting and receiving unit 104*o* supplies to the CPU 101*a* CEC command received from the external device 200 via the CEC line 305. The command transmitting and receiving unit 104*o* supplies to the CPU 101 the CEC command received from the external device 200, and the CPU 101 can control the amplifier 100 based on the CEC command received from the external device 200.

When the amplifier 100 transmits a CEC command to the external device 200 and the external device 200 receives the CEC command from the amplifier 100, the external device 200 transmits to the amplifier 100 a response signal for the CEC command. Therefore, the command transmitting and receiving unit 104o can receive from the external device 200 the response signal for the CEC command. Response signals for a CEC command are classified into two types: a positive signal indicating an acknowledge and a negative signal indicating a negative acknowledge. Regardless of whether or not the first communication block 104 is in the "output mode", "input mode", or "setting mode", the command transmitting and receiving unit 104o can receive and transmit a CEC command. Regardless of whether or not the first communication block 104 is in the "output mode", "input mode", or "setting mode", the command transmitting and receiving unit 104o can also receive a response signal to a CEC command and transmit a response signal to a CEC command.

Each of the second communication block 105 and third communication block 106 has a similar configuration to the first communication block 104. Operation and configuration of the second communication block 105 and the third communication block 106 are similar to those of the first communication block 104, and therefore, duplicated descriptions will be omitted.

The second communication block 105 includes an input/output terminal 105a (not illustrated), a +5V voltage detection unit 105b (not illustrated), a power output unit 105c (not illustrated), a power input unit 105d (not illustrated), and a power switching unit 105e (not illustrated). The second communication block 105 further includes an HPD signal detection unit 105f (not illustrated), an HPD signal output unit 105g (not illustrated), an HPD signal input unit 105h (not illustrated), and an HPD switching unit 105i (not illustrated). The second communication block 105 further includes a device information acquisition unit 105j (not illustrated), a TMDS clock voltage detection unit 105k (not illustrated), a data transmission unit 105l (not illustrated), a data receiving unit 105m (not illustrated), and a data switching unit 105n (not illustrated). The second communication block 105 further includes a command transmitting and receiving unit 105o (not illustrated).

The third communication block 106 includes an input/output terminal 106a (not illustrated), a +5V voltage detection unit 106b (not illustrated), a power output unit 106c (not illustrated), a power input unit 106d (not illustrated), and a power switching unit 106e (not illustrated). The third communication block 106 further includes an HPD signal detection unit 106f (not illustrated), an HPD signal output unit 106g (not illustrated), an HPD signal input unit 106h (not illustrated), and an HPD switching unit 106i (not illustrated). The third communication block 106 further includes a device information acquisition unit 106j (not illustrated), a TMDS clock voltage detection unit 106k (not illustrated), a data transmission unit 106l (not illustrated), a data receiving unit 106m (not illustrated), and a data switching unit 106n (not illustrated). The third communication block 106 further includes a command transmitting and receiving unit 106o (not illustrated).

The power supply unit 107 supplies from an AC power (not illustrated) or a battery (not illustrated) the power required for the amplifier 100.

When the first communication block 104 is in the output mode, the power supply unit 107 supplies the +5V voltage to the power output unit 104c, and the power output unit 104c supplies the received +5V voltage to the external device 200 via the power switching unit 104e and the power transmission line 301. When the first communication block 104 is in the input mode, the power supply unit 107 does not supply the +5V voltage to the power output unit 104c. In the second communication block 105 and the third communication block 106, the power supply unit 107 supplies the +5V voltage in a similar way to the first communication block 104.

The display unit 108 includes a display such as a liquid crystal display (LCD). The display unit 108 displays information about the state of the amplifier 100 and information about the state of the speaker unit 110. The display unit 108 can also display video data received from any one of the data receiving unit 104m, the data receiving unit 105m, and the data receiving unit 106m.

The operation unit 109 provides a user interface for operating the amplifier 100. The operation unit 109 is provided with a power button and a mode changeover button for operating the amplifier 100, and each button includes a switch and a touch panel. The CPU 101 controls the amplifier 100 according to a user instruction input via the operation unit 109.

The speaker unit 110 can output audio data reproduced from the recording medium 111a. The speaker unit 110 can also output audio data received from any one of the data receiving unit 104m, the data receiving unit 105m, and the data receiving unit 106m.

The amplifier 100 may not include the speaker unit 110. In this case, when connected with an external speaker, for example, the amplifier 100 controls the external speaker to output audio data received from any one of the data receiving unit 104m, the data receiving unit 105m, and the data receiving unit 106m. In this case, the amplifier 100 may control the external speaker to output audio data recorded in the memory 102.

The recording unit 111 can record in the recording medium 111a video and audio data received by any one of the data receiving unit 104m, the data receiving unit 105m, and the data receiving unit 106m. The recording unit 111 can further reproduce from the recording medium 111a video and audio data selected by a user. When the first communication block 104 is in the output mode, the recording unit 111 supplies to the data transmission unit 104l video and audio data reproduced from the recording medium 111a by the recording unit 111. In this case, the data transmission unit 104l transmits to the external device 200 via the TMDS line 304 video and audio data supplied from the recording unit 111. When the first communication block 104 is in the input mode, the recording unit 111 does not supply to the data transmission unit 104l video and audio data reproduced from the recording medium 111a by the recording unit 111. When the first communication block 104 is in the input mode, the recording unit 111 records in the recording medium 111a or the memory 102 video and audio data received from the external device 200 by the data receiving unit 104m.

In the second communication block 105 and the third communication block 106, the recording unit 111 supplies to the data transmission unit 105l and the data transmission unit 106l the video and audio data reproduced from the recording medium 111a, in a similar way to the first communication block 104. The recording unit 111 records in the recording medium 111a or the memory 102 the video and audio data received via the second communication block 105 or the third communication block 106, in a similar way to the first communication block 104.

The recording medium 111a is a recording medium such as a memory card and a hard disk drive for storing video and audio data. The recording medium 111a may be a recording medium included in the amplifier 100 or a recording medium detachable from the amplifier 100.

<Setting Process>

Setting process performed by the amplifier 100 according to the first exemplary embodiment will be described below with reference to FIG. 2. FIG. 2 is a flowchart illustrating example setting process performed by the amplifier 100 according to the first exemplary embodiment.

The amplifier 100 executes the setting process when the amplifier 100 enters an operation mode in which a communication based on HDMI is possible. In the first exemplary embodiment, the CPU 101 controls the setting process according to a computer program stored in the memory 102. When the power supply is turned ON or when the physical connection with the external device 200 via the HDMI cable 300 is detected, the amplifier 100 enters an operation mode in which a communication based on HDMI is possible.

When neither an HDMI cable nor an external device is connected to the input/output terminals 104a, 105a, and 106a, each of the first communication block 104, the second communication block 105, and the third communication block 106 enters the "setting mode."

In step S201, the CPU 101 determines whether or not the connection state of the communication unit 103 has changed. The connection state of the communication unit 103 is a state indicating whether or not an external device has been connected with any one of the input/output terminals 104a, 105a, and 106a via an HDMI cable.

When an external device is connected with any one of the input/output terminals 104a, 105a, and 106a via an HDMI cable, the CPU 101 determines that the connection state of the communication unit 103 has changed. Also, when the connection between an external device and any one of the input/output terminals 104a, 105a, and 106a via an HDMI cable is disconnected, the CPU 101 determines that the connection state of the communication unit 103 has changed.

When the connection between an external device and any one of the input/output terminals 104a, 105a, and 106a via an HDMI cable has not changed, the CPU 101 determines that the connection state of the communication unit 103 remains unchanged. Also, when no external device is connected with the input/output terminals 104a, 105a, and 106a via an HDMI cable, the CPU 101 determines that the connection state of the communication unit 103 has not changed.

For example, the CPU 101 may determine whether or not the connection state of the communication unit 103 has changed based on whether or not the +5V voltage detection unit 104b notifies the CPU 101 of the +5V voltage signal of the H level. Furthermore, for example, the CPU 101 may determine whether or not the connection state of the communication unit 103 has changed based on whether or not the TMDS clock voltage detection unit 104k notifies the CPU 101 of the TMDS clock voltage signal of the H level. Furthermore, for example, the CPU 101 may determine whether or not the connection state of the communication unit 103 has changed based on whether or not the command transmitting and receiving unit 104o supplies to the CPU 101a CEC command or a response signal corresponding to the CEC command.

When the CPU 101 determines that the connection state of the communication unit 103 has changed (YES in step S201), the process proceeds to step S202 from step S201. When the CPU 101 determines that the connection state of the communication unit 103 has not changed (NO in step S201), the process repeats step S201.

In step S202, the CPU 101 determines whether or not an external device has been connected with any one of the input/output terminals 104a, 105a, and 106a via an HDMI cable.

For example, when the +5V voltage detection unit 104b notifies the CPU 101 of the +5V voltage signal of the H level, the CPU 101 determines that the input/output terminal 104a and the external device 200 have been connected via the HDMI cable 300. When the +5V voltage detection unit 104b does not notify the CPU 101 of the +5V voltage signal of the H level, the CPU 101 determines that the input/output terminal 104a and the external device 200 are not connected via the HDMI cable 300.

For example, when the TMDS clock voltage detection unit 104k notifies the CPU 101 of the TMDS clock voltage signal of the H level, the CPU 101 determines that the input/output terminal 104a and the external device 200 have been connected via the HDMI cable 300. When the TMDS clock voltage detection unit 104k does not notify the CPU 101 of the TMDS clock voltage signal of the H level, the CPU 101 determines that the input/output terminal 104a and the external device 200 are not connected via the HDMI cable 300.

Furthermore, for example, when the command transmitting and receiving unit 104o supplies to the CPU 101 a CEC command or a response signal corresponding to the CEC command, the CPU 101 determines that the input/output terminal 104a and the external device 200 have been connected via the HDMI cable 300. When the command transmitting and receiving unit 104o has not supplied to the CPU 101a CEC command or a response signal corresponding to the CEC command, the CPU 101 determines that the input/output terminal 104a and the external device 200 are not connected via the HDMI cable 300.

When the CPU 101 determines that the external device has been connected with any one of the input/output terminals 104a, 105a, and 106a via an HDMI cable (YES in step S202), the process proceeds to step to S203 from step S202. When the CPU 101 determines that no external device is connected with the input/output terminal 104a, no external device is connected with input/output terminal 105a, and no external device is connected with input/output terminal 106a (NO in step S202), the process proceeds to step S214 from step S202. In this case (NO in step S202), the CPU 101 determines that the connection between an external device and any one of the input/output terminals 104a, 105a, and 106a via an HDMI cable has been disconnected.

In step S203, the CPU 101 determines whether or not the external device determined to have been connected with any one of the input/output terminals 104a, 105a, and 106a (in step S202) is a sink device.

A case, in the first exemplary embodiment, where the input/output terminal 104a and the external device 200 are connected via the HDMI cable 300 will be described below.

In this case, the CPU 101 determines, using a CEC command, whether or not the external device 200 determined to have been connected with the input/output terminal 104a is a sink device.

In this case, the CPU 101 controls the command transmitting and receiving unit 104o to transmit the <Polling Message> command including logical address "0" to the external device 200 via the CEC line 305. The <Polling Message> command including logical address "0" is a CEC command for determining whether or not the external device 200 is a television (TV). A TV is corresponding to a sink device in the HDMI system. Therefore, when the external device 200 acquires logical address "0" corresponding to the TV, the external device 200 operates as a sink device in the HDMI system. The CPU 101 determines whether or not the command transmitting and receiving unit 104o has received an acknowledge corresponding to the <Polling Message> command including logical address "0" via the CEC line 305. When the command transmitting and receiving unit 104o has received from the external device 200 an acknowledge corresponding to the <Polling Message> command including logical address "0", the CPU 101 determines that the external device 200 is a sink device.

When the command transmitting and receiving unit 104*o* has not received from the external device 200 an acknowledge corresponding to the <Polling Message> command including logical address "0", the CPU 101 determines that the external device 200 is not a sink device. When the command transmitting and receiving unit 104*o* has received from the external device 200 a negative acknowledge corresponding to the <Polling Message> command including logical address "0", the CPU 101 determines that the external device 200 is not a sink device. In the case of another, when the input/output terminal 105*a* and the external device are connected, the CPU 101 may determine, using a CEC command, whether or not the external device connected with the input/output terminal 105*a* is a sink device. In the case of another, when the input/output terminal 106*a* and the external device are connected, the CPU 101 may determine, using a CEC command, whether or not the external device connected with the input/output terminal 106*a* is a sink device.

When the CPU 101 determines that the external device connected with any one of the input/output terminals 104*a*, 105*a*, and 106*a* is a sink device (YES in step S203), the process proceeds to step S204 from step S203.

When the CPU 101 determines that the external device connected with any one of the input/output terminals 104*a*, 105*a*, and 106*a* is not a sink device (NO in step S203), the process proceeds to step S206 from step S203.

In step S204, the CPU 101 sets to the output mode any one of the first communication block 104, the second communication block 105, and the third communication block 106.

For example, in step S203, when the CPU 101 determines that the external device 200 connected to the input/output terminal 104*a* is a sink device, in step S204, the CPU 101 sets the first communication block 104 to the output mode. In this case, the CPU 101 outputs to the power switching unit 104*e*, the HPD switching unit 104*i*, and the data switching unit 104*n* a notification indicating that the first communication block 104 is to be set to the output mode. Upon reception of the notification, the power switching unit 104*e* electrically connects the power output unit 104*c* with the power transmission line 301, and does not electrically connect the power input unit 104*d* with the power transmission line 301.

Upon reception of the notification, the HPD switching unit 104*i* electrically connects the HPD signal input unit 104*h* with the HPD line 302, and does not electrically connect the HPD signal output unit 104*g* with the HPD line 302. Upon reception of the notification, the data switching unit 104*n* electrically connects the data transmission unit 104*l* with the TMDS line 304, and does not electrically connect the data receiving unit 104*m* with the TMDS line 304. Furthermore, for example, when the CPU 101 determines that the external device connected to the input/output terminal 105*a* is a sink device in step S203, the CPU 101 sets the second communication block 105 to the output mode in step S204. Furthermore, for example, when the CPU 101 determines that the external device connected to the input/output terminal 106*a* is a sink device in step S203, the CPU 101 sets the third communication block 106 to the output mode in step S204.

When the CPU 101 sets to the output mode any one of the first communication block 104, the second communication block 105, and the third communication block 106, the process proceeds to step S205 from step S204.

In step S205, the CPU 101 sets to the input mode at least one of the first communication block 104, the second communication block 105, and the third communication block 106.

For example, the CPU 101 sets the second communication block 105 and the third communication block 106 to the input mode when a sink device is connected to the input/output terminal 104*a*, no external device is connected to the input/output terminal 105*a*, and no external device is connected to the input/output terminal 106*a*. In this case, the CPU 101 does not sets the second communication block 105 and the third communication block 106 to the output mode when no external device is connected to the input/output terminal 105*a* and no external device is connected to the input/output terminal 106*a*.

In this case, the CPU 101 outputs to the power switching unit 105*e*, the HPD switching unit 105*i*, and the data switching unit 105*n* a notification indicating that the second communication block 105 is to be set to the input mode. Upon reception of the notification, the power switching unit 105*e* electrically connects the power input unit 105*d* with the power transmission line 301, and does not electrically connect the power output unit 105*c* with the power transmission line 301.

Upon reception of the notification, the HPD switching unit 105*i* electrically connects the HPD signal output unit 105*g* with the HPD line 302, and does not electrically connect the HPD signal input unit 105*h* with the HPD line 302. Upon reception of the notification, the data switching unit 105*n* electrically connects the data receiving unit 105*m* with the TMDS line 304, and does not electrically connect the data transmission unit 105*l* with the TMDS line 304.

In this case, the CPU 101 outputs to the power switching unit 106*e*, the HPD switching unit 106*i*, and the data switching unit 106*n* a notification indicating that the third communication block 106 is to be set to the input mode. Upon reception of the notification, the power switching unit 106*e* electrically connects the power input unit 106*d* with the power transmission line 301, and does not electrically connect the power output unit 106*c* with the power transmission line 301.

Upon reception of the notification, the HPD switching unit 106*i* electrically connects the HPD signal output unit 106*g* with the HPD line 302, and does not electrically connect the HPD signal input unit 106*h* with the HPD line 302. Upon reception of the notification, the data switching unit 106*n* electrically connects the data receiving unit 106*m* with the TMDS line 304, and does not electrically connect the data transmission unit 106*l* with the TMDS line 304.

Furthermore, for example, when a sink device is connected to the input/output terminal 104*a*, a source device is connected to the input/output terminal 105*a*, and no external device is connected to the input/output terminal 106*a*, the CPU 101 sets the third communication block 106 to the input mode. In this case, even if no external device is connected to the input/output terminal 106*a*, the CPU 101 does not set the third communication block 106 to the output mode. Furthermore, for example, the CPU 101 sets the first communication block 104 and the second communication block 105 to the input mode when no external device is connected to the input/output terminal 104*a*, no external device is connected to the input/output terminal 105*a*, and a sink device is connected to the input/output terminal 106*a*. In this case, even if no external device is connected to the input/output terminal 104*a*, the CPU 101 does not set the first communication block 104 to the output mode. In this case, even if no external device is connected to the input/output terminal 105a, the CPU 101 does not set the second communication block 105 to the output mode.

Further, when a sink device is connected to one of the first communication block 104, the second communication block 105, and the third communication block 106, the CPU 101 restricts a communication using a CEC command. In this case, even if a sink device is connected to the first communication block 104 set to the input mode, the CPU 101 does not perform the communication using a CEC command. In the case of another, even if a sink device is connected to the second communication block 105 set to the input mode, the CPU 101 does not perform the communication using a CEC command. In the case of another, even if a sink device is connected to the third communication block 106 set to the input mode, the CPU 101 does not perform the communication using a CEC command. Thus, when a second sink device is connected to the amplifier 100, it is possible to prevent interference to the communication between the external device determined to be a sink device (in step S203) and the amplifier 100 using a CEC command.

When the CPU 101 sets to the input mode any one of the first communication block 104, the second communication block 105, and the third communication block 106, the process exits this flowchart. When an external device has already been connected to each of the input/output terminals 104a, 105a, and 106a, the CPU 101 does not execute the process in step S205.

In step S206, the CPU 101 determines whether or not the external device determined to have been connected with any one of the input/output terminals 104a, 105a, and 106a (in step S202) is a source device.

A case, in the first exemplary embodiment, will be described as an example, where the input/output terminal 104a and the external device 200 are connected via the HDMI cable 300.

The CPU 101 determines, using a CEC command, whether or not the external device 200 determined to have been connected to the input/output terminal 104a is a source device. In this case, the CPU 101 controls the command transmitting and receiving unit 104o to transmit to the external device 200 via the CEC line 305 the <Polling Message> command including any one of logical addresses "1" to "4" and "6" to "11."

The <Polling Message> command including any one of logical addresses "1" to "4" and "6" to "11" is a CEC command for determining whether or not the external device 200 is a source device in the HDMI system. Therefore, when the external device 200 acquires any one of logical addresses "1" to "4" and "6" to "11", the external device 200 operates as a source device in the HDMI system. The CPU 101 determines whether or not the command transmitting and receiving unit 104o has received via the CEC line 305 an acknowledge corresponding to the <Polling Message> command including any one of logical addresses "1" to "4" and "6" to "11." When the command transmitting and receiving unit 104o has received an acknowledge corresponding to the <Polling Message> command including any one of logical addresses "1" to "4" and "6" to "11", the CPU 101 determines that the external device 200 is a source device.

Further, when the command transmitting and receiving unit 104o has not received an acknowledge corresponding to the <Polling Message> command including any one of logical addresses "1" to "4" and "6" to "11", the CPU 101 determines that the external device 200 is not a source device. When the command transmitting and receiving unit 104o has received a negative acknowledge corresponding to the <Polling Message> command including any one of logical addresses "1" to "4" and "6" to "11", the CPU 101 determines that the external device 200 is not a source device. In the case of another, when the input/output terminal 105a and the external device are connected, the CPU 101 may determine, using a CEC command, whether or not the external device connected with the input/output terminal 105a is a source device. In the case of another, when the input/output terminal 106a and the external device are connected, the CPU 101 may determine, using a CEC command, whether or not the external device connected with the input/output terminal 106a is a source device.

When the CPU 101 determines that an external device connected with any one of the input/output terminals 104a, 105a, and 106a is a source device (YES in step S206), the process proceeds to step S207 from step S206.

When the CPU 101 determines that an external device connected with any one of the input/output terminals 104a, 105a, and 106a is not a source device (NO in step S206), the process proceeds to step S211 from step S206.

In step S207, the CPU 101 sets to the input mode any one of the first communication block 104, the second communication block 105, and the third communication block 106.

For example, when the CPU 101 determines that the external device 200 connected to the input/output terminal 104a is a source device (YES in step S206), then in step S207, the CPU 101 sets the first communication block 104 to the input mode. In this case, the CPU 101 outputs to the power switching unit 104e, the HPD switching unit 104i, and the data switching unit 104n a notification indicating that the first communication block 104 is to be set to the input mode. Upon reception of the notification, the power switching unit 104e electrically connects the power input unit 104d with the power transmission line 301, and does not electrically connect the power output unit 104c with the power transmission line 301.

Upon reception of the notification, the HPD switching unit 104i electrically connects the HPD signal output unit 104g with the HPD line 302, and does not electrically connect the HPD signal input unit 104h with the HPD line 302. Upon reception of the notification, the data switching unit 104n electrically connects the data receiving unit 104m with the TMDS line 304, and does not electrically connect the data transmission unit 104l with the TMDS line 304. Furthermore, for example, when the CPU 101 determines that the external device connected to the input/output terminal 105a is a source device in step S206, the CPU 101 sets the second communication block 105 to the input mode in step S207. Furthermore, for example, when the CPU 101 determines that the external device connected to the input/output terminal 106a is a source device in step S206, the CPU 101 sets the third communication block 106 to the input mode in step S207.

When the CPU 101 sets to the input mode any one of the first communication block 104, the second communication block 105, and the third communication block 106, the process proceeds to step S208 from step S207.

In step S208, the CPU 101 determines whether or not the number of input/output terminals connected with no external device is one. When the CPU 101 determines that the number of input/output terminals connected with no external device is one (YES in step S208), the process proceeds to step S209 from step S208. When the CPU 101 determines that the number of input/output terminals connected with no external device is not one (NO in step S208), the process returns to step S201 from step S208.

In step S209, the CPU 101 determines whether or not a sink device has already been connected to any one of the input/ output terminals 104a, 105a, and 106a. When the CPU 101 determines that a sink device has already been connected to any one of the input/output terminals 104a, 105a, and 106a (YES in step S209), the process proceeds to step S213 from step S209. When the CPU 101 determines that a sink device has not been connected to either one of the input/output terminals 104a, 105a, and 106a (NO in step S209), the process proceeds to step S210 from step S209.

In step S210, the CPU 101 sets to the output mode any one of the first communication block 104, the second communication block 105, and the third communication block 106. For example, the CPU 101 sets the third communication block 106 to the output mode in step S210 when a source device is connected to the input/output terminal 104a, a source device is connected to the input/output terminal 105a, and no external device is connected to the input/output terminal 106a. In this case, the CPU 101 does not set to the input mode the third communication block 106. Furthermore, for example, the CPU 101 sets the first communication block 104 to the output mode in step S210 when no external device is connected to the input/output terminal 104a, a source device is connected to the input/output terminal 105a, and a source device is connected to the input/output terminal 106a. In this case, the CPU 101 does not set to the input mode the first communication block 104. Furthermore, for example, the CPU 101 sets the second communication block 105 to the output mode in step S210 when a source device is connected to the input/output terminal 104a, no external device is connected to the input/output terminal 105a, and a source device is connected to the input/output terminal 106a. In this case, the CPU 101 does not set to the input mode the second communication block 105. When the CPU 101 sets to the output mode any one of the first communication block 104, the second communication block 105, and the third communication block 106, the process exits this flowchart.

Further, the CPU 101 may restrict a communication using a CEC command as to the third communication block 106 if the third communication block 106 is set to the output mode (in step S210). The CPU 101 does not perform the communication using a CEC command even if a source device is connected to the third communication block 106 when the third communication block 106 is set to the output mode.

When an external device connected with any one of the input/output terminals 104a, 105a, and 106a is neither a sink nor source device (NO in step S206), the CPU 101 determines that a repeater has been connected to the amplifier 100. When a repeater is connected with another repeater in the HDMI system, the amplifier 100 may not be able to normally communicate with an external device using a CEC command.

Therefore, in step S211, the CPU 101 displays a warning message on the display unit 108. The warning message may indicate, for example, that the amplifier 100 and an external device are not normally connected, or request the user to detach an external device from the amplifier 200. The warning message may indicate that a CEC command cannot be used. In step S211, the CPU 101 may instruct the speaker unit 110 to output a warning message.

When at least one of the display unit 108 and the speaker unit 110 outputs a warning message, the process proceeds to step S212 from step S211.

In step S212, the CPU 101 sets to the error mode any one of the first communication block 104, the second communication block 105, and the third communication block 106. For example, when a repeater is connected to the input/output terminal 104a, the CPU 101 sets the first communication block 104 to the error mode in step S212. Furthermore, for example, when a repeater is connected to the input/output terminal 105a, the CPU 101 sets the second communication block 105 to the error mode in step S212. Furthermore, for example, when a repeater is connected to the input/output terminal 106a, the CPU 101 sets the third communication block 106 to the error mode in step S212.

The error mode is a mode in which a communication block corresponding to an input/output terminal connected with a repeater is not to be changed to any other mode than the setting mode. Until a repeater is detached from the amplifier 100, the CPU 101 maintains the setting of the setting mode for the communication block set to the error mode. Therefore, the communication block set to the error mode can neither transmit nor receive video and audio data.

Furthermore, the CPU inhibits the communication block set to the error mode from communicating a CEC command. Therefore, the communication block set to the error mode can neither transmit nor receive a CEC command.

When the CPU 101 sets to the error mode any one of the first communication block 104, the second communication block 105, and the third communication block 106, the process proceeds to step S208 from step S212.

In step S213, the CPU 101 sets to the input mode any one of the first communication block 104, the second communication block 105, and the third communication block 106. For example, the CPU 101 sets the third communication block 106 to the input mode in step S213 when a sink device is connected to the input/output terminal 104a, a source device is connected to the input/output terminal 105a, and no external device is connected to the input/output terminal 106a. In this case, the CPU 101 does not set to the output mode the third communication block 106. Furthermore, for example, the CPU 101 sets the first communication block 104 to the input mode in step S213 when no external device is connected to the input/output terminal 104a, a sink device is connected to the input/output terminal 105a, and a source device is connected to the input/output terminal 106a. In this case, the CPU 101 does not set to the output mode the first communication block 104. Furthermore, for example, the CPU 101 sets the second communication block 105 to the input mode in step S213 when a source device is connected to the input/output terminal 104a, no external device is connected to the input/output terminal 105a, and a sink device is connected to the input/output terminal 106a. In this case, the CPU 101 does not set to the output mode the second communication block 105. The CPU 101 does not set to the output mode any one of the first communication block 104, the second communication block 105, and the third communication block 106.

When the CPU 101 sets to the input mode any one of the first communication block 104, the second communication block 105, and the third communication block 106, the process exits this flowchart. In this case, even if a sink device is connected to a communication block set to the input mode, the CPU 101 does not perform a communication using a CEC command.

In step S214, the CPU 101 determines whether or not the external device determined to have been detached from any one of the input/output terminals 104a, 105a, and 106a is a sink device. The CPU 101 determines, using a CEC command, whether or not the external device determined to have been detached from any one of the input/output terminals 104a, 105a, and 106a is a sink device.

In this case, the CPU 101 controls the command transmitting and receiving unit 104o to transmit the <Polling Message> command including logical address "0" to the external device 200 via the CEC line 305. When the command transmitting and receiving unit 104o receives from the external device 200 an acknowledge corresponding to the <Polling Message> command including logical address "0", the CPU 101 determines that the detached external device is not a sink device. When the command transmitting and receiving unit 104o has not received from the external device 200 an acknowledge corresponding to the <Polling Message> command including logical address "0", the CPU 101 determines that the detached external device is a sink device. When the command transmitting and receiving unit 104o receives from the external device 200 a negative acknowledge corresponding to the <Polling Message> command including logical address "0", the CPU 101 determines that the detached external device is a sink device.

When the CPU 101 determines that the external device detached from any one of the input/output terminals 104a, 105a, and 106a is a sink device (YES in step S214), the process proceeds to step S215 from step S214.

When the CPU 101 determines that the external device detached from any one of the input/output terminals 104a, 105a, and 106a is not a sink device (NO in step S214), the process proceeds to step S217 from step S214.

In step S215, the CPU 101 sets to the setting mode any one of the first communication block 104, the second communication block 105, and the third communication block 106. For example, when a sink device is detached from the input/output terminal 104a, the CPU 101 releases the first communication block 104 from the output mode in step S215 and sets the first communication block 104 to the setting mode in step S215. Furthermore, for example, when a sink device is detached from the input/output terminal 105a, the CPU 101 releases the second communication block 105 from the output mode in step S215 and sets the second communication block 105 to the setting mode in step S215. Furthermore, for example, when a sink device is detached from the input/output terminal 106a, the CPU 101 releases the third communication block 106 from the output mode in step S215 and sets the third communication block 106 to the setting mode in step S215. Thus, the CPU 101 releases from the output mode any one of the first communication block 104, the second communication block 105, and the third communication block 106. In this case, the process proceeds to step S216 from step S215.

In step S216, the CPU 101 sets to the setting mode at least one of the first communication block 104, the second communication block 105, and the third communication block 106. For example, when the input/output terminal 104a is connected with no external device, the CPU 101 releases the first communication block 104 from the input mode in step S216 and sets the first communication block 104 to the setting mode in step S216. Furthermore, for example, when the input/output terminal 105a is connected with no external device, the CPU 101 releases the second communication block 105 from the input mode in step S216 and sets the second communication block 105 to the setting mode in step S216. Furthermore, for example, when the input/output terminal 106a is connected with no external device, the CPU 101 releases the third communication block 106 from the input mode in step S216 and sets the third communication block 106 to the setting mode in step S216.

Thus, the CPU 101 releases from the input mode at least one of the first communication block 104, the second communication block 105, and the third communication block 106. In this case, the process exits this flowchart.

When the external device detached from any one of the input/output terminals 104a, 105a, and 106a is not a sink device (NO in step S214), the CPU 101 determines that a source device has been detached from the amplifier 100. In step S217, the CPU 101 sets to the setting mode any one of the first communication block 104, the second communication block 105, and the third communication block 106. For example, when a source device is detached from the input/output terminal 104a, the CPU 101 releases the first communication block 104 from the input mode in step S217 and sets the first communication block 104 to the setting mode in step S217. Furthermore, for example, when a source device is detached from the input/output terminal 105a, the CPU 101 releases the second communication block 105 from the input mode in step S217 and sets the second communication block 105 to the setting mode in step S217. Furthermore, for example, when a source device is detached from the input/output terminal 106a, the CPU 101 releases the third communication block 106 from the input mode in step S217 and sets the third communication block 106 to the setting mode in step S217. Thus, the CPU 101 releases from the input mode any one of the first communication block 104, the second communication block 105, and the third communication block 106. In this case, the process proceeds to step S218 from step S217.

In step S218, the CPU 101 determines whether or not the number of input/output terminals connected with no external device is two. When the CPU 101 determines that the number of input/output terminals connected with no external device is two (YES in step S218), the process proceeds to step S219 from step S218. When the CPU 101 determines that the number of input/output terminals connected with no external device is not two (NO in step S218), the process returns to step S201 from step S218.

In step S219, the CPU 101 determines whether or not a sink device is connected to any one of the input/output terminals 104a, 105a, and 106a. When the CPU 101 determines that a sink device is connected to any one of the input/output terminals 104a, 105a, and 106a (YES in step S219), the process exits this flowchart.

When the CPU 101 determines that a sink device is not connected to either one of the input/output terminal 104a, 105a, and 106a (NO in step S219), the process proceeds to step S220 from step S219.

In step S220, the CPU 101 sets to the setting mode at least one of the first communication block 104, the second communication block 105, and the third communication block 106. For example, when the input/output terminal 104a is connected with no external device, the CPU 101 releases the first communication block 104 from the output mode in step S220 and sets the first communication block 104 to the setting mode in step S220. Furthermore, for example, when the input/output terminal 105a is connected with no external device, the CPU 101 releases the second communication block 105 from the output mode in step S220 and sets the second communication block 105 to the setting mode in step S220. Furthermore, for example, when the input/output terminal 106a is connected with no external device, the CPU 101 releases the third communication block 106 from the output mode in step S220 and sets the third communication block 106 to the setting mode in step S220. Thus, the CPU 101 releases from the output mode at least one of the first communication block 104, the second communication block 105, and the third communication block 106. In this case, the process exits this flowchart.

Each of the first communication block 104, the second communication block 105, and the third communication block 106 performs a communication based on HDMI with the external device according to the mode set in the setting process (see FIG. 2).

In step S203, the CPU 101 determines, using a CEC command, whether or not the external device determined to have been connected with any one of the input/output terminals 104a, 105a, and 106a is a sink device. However, the process is not limited thereto.

For example, in step S203, the CPU 101 may determine whether or not the external device 200 is a sink device according to the +5V voltage signal notified from the +5V voltage detection unit 104b and the TMDS clock voltage signal notified from the TMDS clock voltage detection unit 104k.

When the +5V voltage detection unit 104b notifies the CPU 101 of the +5V voltage signal of the L level and when the TMDS clock voltage detection unit 104k notifies the CPU 101 of the TMDS clock voltage signal of the H level, the CPU 101 determines that the external device 200 is a sink device. When the +5V voltage detection unit 104b does not notify the CPU 101 of the +5V voltage signal of the L level or when the TMDS clock voltage detection unit 104k does not notify the CPU 101 of the TMDS clock voltage signal of the H level, the CPU 101 determines that the external device 200 is not a sink device.

In step S214, the CPU 101 determines, using a CEC command, whether or not the external device determined to have been detached from any one of the input/output terminals 104a, 105a, and 106a is a sink device. However, the process is not limited thereto. For example, in step S214, the CPU 101 may determine whether or not the external device 200 is a sink device according to the +5V voltage signal notified from the +5V voltage detection unit 104b and the TMDS clock voltage signal notified from the TMDS clock voltage detection unit 104k.

In step S206, the CPU 101 determines, using a CEC command, whether or not the external device determined to have been connected with any one of the input/output terminals 104a, 105a, and 106a is a source device. However, the process is not limited thereto. For example, in step S206, the CPU 101 may determine whether or not the external device 200 is a source device according to +5V voltage signal notified from the +5V voltage detection unit 104b and the TMDS clock voltage signal notified from the TMDS clock voltage detection unit 104k. When the +5V voltage detection unit 104b notifies the CPU 101 of the +5V voltage signal of the H level and when the TMDS clock voltage detection unit 104k notifies the CPU 101 of the TMDS clock voltage signal of the L level, the CPU 101 determines that the external device 200 is a source device.

When the +5V voltage detection unit 104b does not notify the CPU 101 of the +5V voltage signal of the H level or when the TMDS clock voltage detection unit 104k does not notify the CPU 101 of the TMDS clock voltage signal of the L level, the CPU 101 determines that the external device 200 is not a source device.

In step S211, the CPU 101 displays a warning message to the display unit 108. However, after confirming that the external device determined to have been connected with any one of the input/output terminals 104a, 105a, and 106a is a repeater, the CPU 101 may execute the process in step S211. For example, the CPU 101 may determine, using a CEC command, whether or not the external device determined to have been connected with any one of the input/output terminals 104a, 105a, and 106a is a repeater. In this case, for example, the CPU 101 controls the command transmitting and receiving unit 104o to transmit the <Polling Message> command including logical address "5" to the external device 200 via the CEC line 305. When the command transmitting and receiving unit 104o receives from the external device 200 a positive signal for the <Polling Message> command including logical address "5", the CPU 101 determines that the external device 200 is a repeater.

When the command transmitting and receiving unit 104o has not received from the external device 200 a positive signal for the <Polling Message> command including logical address "5", the CPU 101 determines that the external device 200 is not a repeater. When the command transmitting and receiving unit 104o receives from the external device 200 a negative signal for the <Polling Message> command including logical address "5", the CPU 101 determines that the external device 200 is not a repeater.

The CPU 101 executes the process in step S208 after the CPU 101 executes the process in steps S211 and S212. However, after completion of the process in step S212, the CPU 101 may instruct the first communication block 104, second communication block 105, and third communication block 106 to stop a communication based on HDMI, and terminate the setting process (see FIG. 2). In this case, the CPU 101 may instruct the amplifier 100 not to perform a communication based on HDMI before the error mode set to any one of the first communication block 104, the second communication block 105, and the third communication block 106 is released.

In the electronic apparatus 100 according to the first exemplary embodiment, when a sink device is connected to one input/output terminal, the CPU 101 sets to the input mode without setting to the output mode a communication block. In this case, the communication block set to the input mode corresponds to other input/output terminal connected with no external device. Thus, when a second sink device is connected to the communication block set to the input mode, the CPU 101 does not perform a communication based on HDMI. Therefore, when a source device is connected to the communication block set to the input mode, the CPU 101 performs a communication based on HDMI.

Therefore, when a first sink device is connected to an input/output terminal and a second sink device is connected to the electronic apparatus 100, it is possible to prevent interference to CEC communication between the first sink device and the electronic apparatus 100. Therefore, when the electronic apparatus 100 has a plurality of input/output terminals, it is possible to normally perform the CEC communication.

In the electronic apparatus 100 according to the first exemplary embodiment, when the number of input/output terminals connected with no external device is one and when there is no input/output terminal connected with a sink device, the CPU 101 sets to the output mode without setting the input mode a communication block. In this case, the communication block set to the output mode corresponds to other input/output terminal connected with no external device. When a source device is connected to the communication block set the output mode, the CPU 101 does not perform a communication based on HDMI. Therefore, when a sink device is connected to the communication block set the output mode, the CPU 101 performs a communication based on HDMI.

Therefore, when two source devices are connected to input/output terminals, one sink device can be connected to the electronic apparatus 100. Therefore, when the electronic apparatus 100 has a plurality of input/output terminals, the electronic apparatus 100 can normally perform the CEC communication.

In the first exemplary embodiment, an amplifier 300 includes the input/output terminals 104a, 105a, and 106a. However, as long as the amplifier 300 has a plurality of input/output terminals, a number of input/output terminals may be two, or four or more.

Further, in the first exemplary embodiment, the amplifier 300 includes the power output unit 104c, the power output unit 105c, and the power output unit 106c. However, process performed by the power output unit 104c, the power output unit 105c, and the power output unit 106c may be achieved by one common power output unit.

Further, in the first exemplary embodiment, the amplifier 300 includes the device information acquisition unit 104j, the device information acquisition unit 105j, and the device information acquisition unit 106j. However, process performed by the device information acquisition unit 104j, the device information acquisition unit 105j, and the device information acquisition unit 106j may be achieved by one common device information acquisition unit. In this case, the amplifier 300 further includes a determination unit for determining an input/output terminal through which device information is supplied and an input/output terminal through which device information is requested.

Further, in the first exemplary embodiment, the amplifier 300 includes the data transmission unit 104l, the data transmission unit 105l, and the data transmission unit 106l. However, process performed by the data transmission unit 104l, the data transmission unit 105l, and the data transmission unit 106l may be achieved by one common data transmission unit.

Further, in the first exemplary embodiment, the amplifier 300 includes the command transmitting and receiving unit 104o, the command transmitting and receiving unit 105o, and the command transmitting and receiving unit 106o. However, process performed by the command transmitting and receiving unit 104o, the command transmitting and receiving unit 105o, and the command transmitting and receiving unit 106o may be achieved by one common command transmitting and receiving unit. In this case, the amplifier 300 further includes a determination unit for determining an input/output terminal through which a command is transmitted and an input/output terminal through which a command is received.

Other Embodiments

The electronic apparatus 100 according to the present invention is not limited to the electronic apparatus 100 described in the first exemplary embodiment. For example, the electronic apparatus 100 according to the present invention can also be achieved by a system including a plurality of apparatuses.

Further, various processing and functions described in the first exemplary embodiment can also be achieved by a computer program. In this case, the computer program according to the present invention can be executed by a computer (including a CPU) to achieve various functions described in the first exemplary embodiment.

Of course, the computer program according to the present invention may achieve various processing and functions described in the first exemplary embodiment by using an operating system (OS) running on the computer.

The computer program according to the present invention is read from a computer-readable recording medium and then executed by the computer. The computer-readable recording medium may be a hard disk drive, an optical disc, a compact disc read only memory (CD-ROM), a compact disc readable (CD-R), a memory card, and a read only memory (ROM). The computer program according to the present invention may be supplied from an external device to the computer via a communication interface and then executed by the computer.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-230027 filed Oct. 19, 2011, which is hereby incorporated by reference herein in its entirety.

What is claimed is:

1. An electronic apparatus comprising:
a first communication unit that includes a first connector, wherein the first connector is used for connecting a first external device, and the first communication unit communicates via the first connector;
a second communication unit that includes a second connector, wherein the second connector is used for connecting a second external device, the second connector is different from the first connector, and the second communication unit communicates via the second connector; and
a transmitting unit that transmits a command for determining whether the first external device is a sink device if the first connector and the first external device are connected; and
a control unit that (a) determines, using the command, whether the first external device is the sink device if the first external device is connected to the first connector and the second external device is not connected to the second connector, (b) sets a mode of the first communication unit to a first mode if the first external device, determined to be the sink device, is connected to the first connector and the second external device is not connected to the second connector, and (c) sets a mode of the second communication unit to a second mode if the first external device, determined to be the sink device, is connected to the first connector and the second external device is not connected to the second connector, wherein the first mode is used for transmitting at least one of image data and audio data, and the second mode is used for receiving at least one of image data and audio data.

2. The electronic apparatus according to claim 1, wherein the control unit does not set the mode of the second communication unit to the first mode if the first external, determined to be the sink device, is connected to the first connector.

3. The electronic apparatus according to claim 1, wherein the control unit sets the mode of the second communication unit to the first mode if the first external device, determined to be a source device, is connected to the first connector.

4. The electronic apparatus according to claim 1, wherein the control unit does not set the mode of the second communication unit to the second mode if the first external device, determined to be a source device, is connected to the first connector.

5. The electronic apparatus according to claim 1, wherein the control unit sets, based on whether the second external apparatus which is connected to the second connector is the sink device, the mode of the second communication unit to one of the first mode and the second mode if the first connector and the first external device are not connected.

6. The electronic apparatus according to claim 1, wherein the control unit releases a setting relating to the second communication unit in accordance with a disconnection between the first connector and the first external device if the second connector and the second external device are not connected.

7. The electronic apparatus according to claim 1, wherein the control unit releases a setting relating to the first communication unit if the first connector and the first external device are disconnected.

8. The electronic apparatus according to claim 1, wherein the second communication unit obtains information relating to the second external device from the second external device which is connected to the second connector if the mode of the second communication unit is the first mode, and the second communication unit transmits data generated based on the information to the second external device which is connected to the second connector if the mode of the second communication unit is the first mode.

9. The electronic apparatus according to claim 1, wherein the second communication unit transmits information relating to the electronic apparatus to the second external device which is connected to the second connector in accordance with a request from the second external device which is connected to the second connector if the mode of the second communication unit is the second mode.

10. The electronic apparatus according to claim 1, wherein the control unit performs a process for informing a warning message if the type of the first external device which is connected to the first connector is a repeater device.

11. A method for controlling an electronic apparatus, wherein the electronic apparatus includes a first communication unit, a second communication unit, and a transmitting unit, wherein the first communication unit includes a first connector, the first connector is used for connecting a first external device, and the first communication unit communicates via the first connector, wherein the second communication unit includes a second connector, the second connector is used for connecting a second external device, the second connector is different from the first connector, and the second communication unit communicates via the second connector, and wherein the transmitting unit transmits a command for determining whether the first external device is a sink device if the first connector and the first external device are connected, the method comprising:

determining, using the command, whether the first external device is the sink device if the first external device is connected to the first connector and the second external device is not connected to the second connector; and setting a mode of the first communication unit to a first mode if the first external device, determined to be the sink device, is connected to the first connector and the second external device is not connected to the second connector, wherein the first mode is used for transmitting at least one of image data and audio data; and setting a mode of the second communication unit to a second mode if the first external device, determined to be the sink device, is connected to the first connector and the second external device is not connected to the second connector, wherein the second mode is used for receiving at least one of image data and audio data.

\* \* \* \* \*